(12) United States Patent
Karri et al.

(10) Patent No.: US 11,875,194 B2
(45) Date of Patent: Jan. 16, 2024

(54) POSITIONING OF EDGE COMPUTING DEVICES

(71) Applicant: International Business Machines Corporation, Armonk, NY (US)

(72) Inventors: Venkata Vara Prasad Karri, Visakhapatnam (IN); Sowjanya Rao, Hyderabad (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 429 days.

(21) Appl. No.: 17/357,257

(22) Filed: Jun. 24, 2021

(65) Prior Publication Data
US 2022/0413934 A1     Dec. 29, 2022

(51) Int. Cl.
*G06F 9/44*     (2018.01)
*G06F 9/50*     (2006.01)
*H04W 64/00*     (2009.01)
*G06F 9/48*     (2006.01)

(52) U.S. Cl.
CPC .......... *G06F 9/5077* (2013.01); *G06F 9/4881* (2013.01); *G06F 9/5038* (2013.01); *H04W 64/00* (2013.01)

(58) Field of Classification Search
CPC ................................................... G06F 9/5077
USPC ......................................................... 718/104
See application file for complete search history.

(56) References Cited

U.S. PATENT DOCUMENTS

| 9,412,000 | B1* | 8/2016 | Ge | .......................... G01S 5/0289 |
| 2014/0121786 | A1 | 5/2014 | Chen | |
| 2020/0228602 | A1* | 7/2020 | Spoczynski | ......... H04L 67/1021 |
| 2020/0296155 | A1* | 9/2020 | McGrath | ............... G06F 9/5027 |

OTHER PUBLICATIONS

Anonymous. "Auto-scheduling of devices in smart house for optimum resource consumption w.r.t. user's need." Published Jul. 12, 2019. 4 pages. Published by IP.com. https://priorart.ip.com/IPCOM/000259106.
Anonymous. "Home Edge." Printed Feb. 2, 2021. 4 pages. Published by LF Edge. https://www.lfedge.org/projects/homeedge/.
Anonymous. "Planning Your New Construction Smart Home." Accessed Apr. 5, 2021. 6 pages. Published by Moseley Electronics. https://www.moseleyelectronics.com/2018/03/17/planning-your-new-construction-smart-home/.
(Continued)

*Primary Examiner* — Timothy A Mudrick
(74) *Attorney, Agent, or Firm* — Michael A. Petrocelli

(57) ABSTRACT

A processor may receive user data associated with one or more locations of a user in an environment. The processor may receive edge computing data associated with utilization of edge computing resources by the user. The processor may analyze the edge computing data to associate a context with an edge computing resource need. The processor may analyze the user data to associate a context with a location of the user within the environment. The processor may determine a first location of the user in the environment at a first time. The processor may predict a first edge computing need of the user in the first location. The processor may determine an arrangement of one or more edge computing devices configured to meet the first edge computing need of the user at the first time.

20 Claims, 5 Drawing Sheets

(56) References Cited

OTHER PUBLICATIONS

Anonymous. "Robots that can see into their future developed." Published Dec. 5, 2017. 10 pages. Published by The Economic Times. https://cio.economictimes.indiatimes.com/news/internet-of-things/robots-that-can-see-into-their-future-developed/61931034.

Babou, et al., "Home Edge Computing (HEC): Design of a New Edge Computing Technology for Achieving Ultra-Low Latency." Published Jun. 2018. 16 pages. Published by Research Gate. https://www.researchgate.net/publication/325800566_Home_Edge_Computing_HEC_Design_of_a_New_Edge_Computing_Technology_for_Achieving_Ultra-Low_Latency.

Chakraborty, et al., "Home automation using edge computing and Internet of Things." Published in 2017. 3 pages. In 2017 IEEE International Symposium on Consumer Electronics (ISCE), Kuala Lumpur, Malaysia, pp. 47-49. https://ieeexplore.ieee.org/abstract/document/8355544.

Ganju, "HMI Bringing AI at the Edge to Smart Home." Published Aug. 4, 2020. Printed Feb. 1, 2021. 5 pages. Published by EET Asia. https://www.eetasia.com/hmi-bringing-ai-at-the-edge-to-smart-home/.

Gupta, "Edge Intelligence Makes Smart Homes Truly Intelligent." Published Jun. 11, 2019. 9 pages. Published by Connect Altran. https://connect.altran.com/2019/06/edge-intelligence-makes-smart-homes-truly-intelligent/.

Hsu, et al., "Design and Implementation of a Smart Home System Using Multisensor Data Fusion Technology." Published Jul. 15, 2017. 21 pages. Published by Research Gate. https://www.researchgate.net/publication/318501962.

Kim, et al., "Developing Design Solutions for Smart Homes Through User-Centered Scenarios." Published Mar. 20, 2020. 12 pages. In Front. Psychol, vol. 11. Published by Frontiers in Psychology. https://www.frontiersin.org/articles/10.3389/ fpsyg.2020.00335/full.

Mell, et al., "The NIST Definition of Cloud Computing," Recommendations of the National Institute of Standards and Technology, U.S. Department of Commerce, Special Publication 800-145, Sep. 2011, 7 pgs.

Murray, "How edge computing makes voice assistants faster and more powerful." Published Mar. 9, 2018. 6 pages. Published by Network World. https://www.networkworld.com/article/3262105/how-edge-computing-makes-voice-assistants-faster-and-more-powerful.html.

Shaw, "What is edge computing and why it matters." Published Nov. 13, 2019. 6 pages. Published by Network World. https://www.networkworld.com/article/3224893/what-is-edge-computing-and-how-it-s-changing-the-network.html.

\* cited by examiner

POSITIONING OF EDGE COMPUTING DEVICES

BACKGROUND

The present disclosure relates generally to the field of edge computing, and more specifically to determining an arrangement of edge computing devices configured to meet the edge computing needs of a user.

Edge computing is a distributed computing paradigm that brings computation and data storage closer to the location where it is needed to improve response times and save bandwidth.

SUMMARY

Embodiments of the present disclosure include a method, computer program product, and system for determining an arrangement of edge computing devices configured to meet the edge computing needs of a user.

A processor may receive user data associated with one or more locations of a user in an environment. The processor may receive edge computing data associated with utilization of edge computing resources by the user. The processor may analyze the edge computing data to associate a context with an edge computing resource need. The processor may analyze the user data to associate a context with a location of the user within the environment. The processor may determine a first location of the user in the environment at a first time. The processor may predict a first edge computing need of the user in the first location. The processor may determine an arrangement of one or more edge computing devices configured to meet the first edge computing need of the user at the first time.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
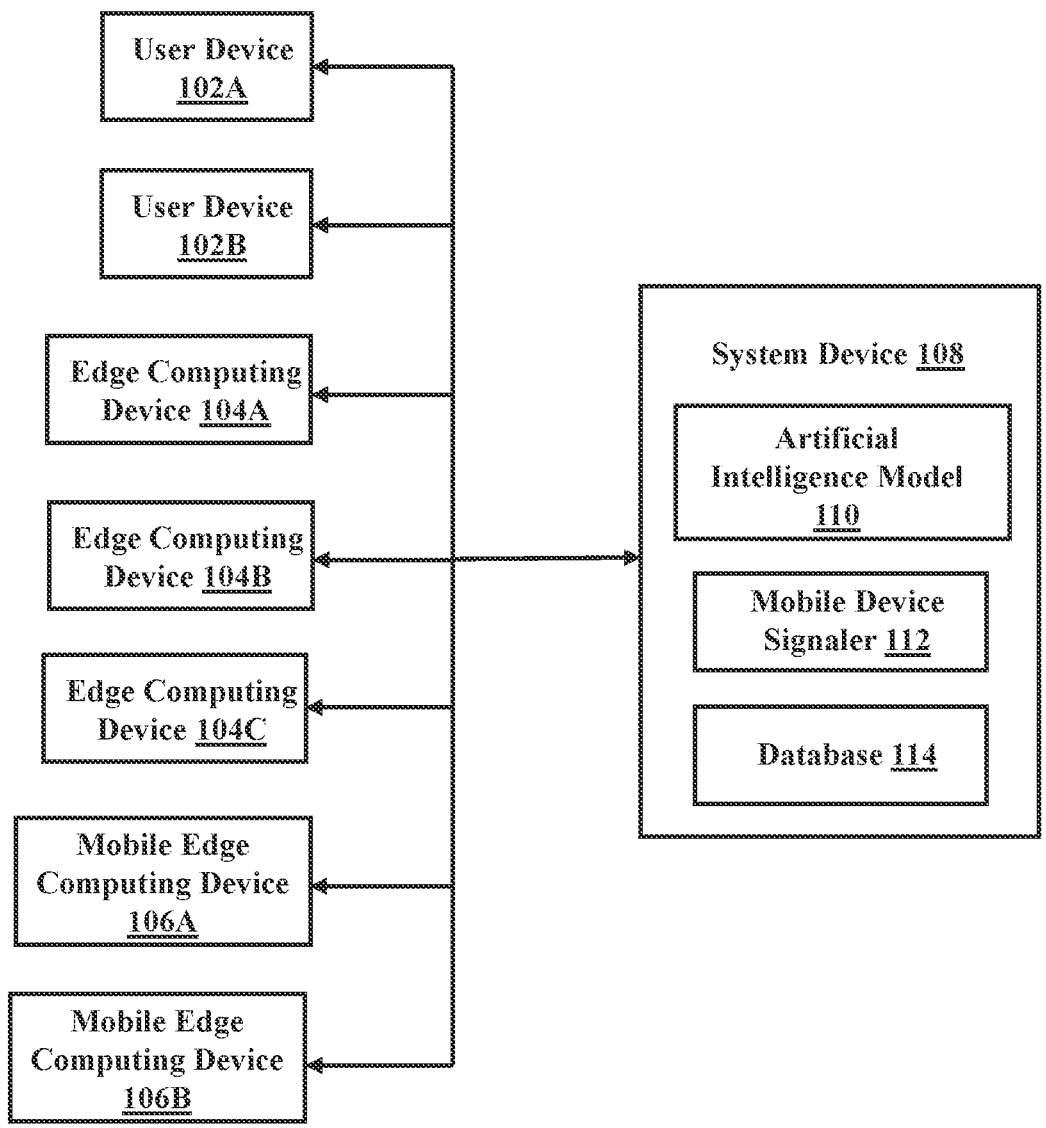
FIG. 1 is a system diagram of an exemplary system for positioning edge computing devices, in accordance with aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of edge computing, and more specifically to determining an arrangement of edge computing devices configured to meet the edge computing needs of a user. While the present disclosure is not necessarily limited to such applications, various aspects of the disclosure may be appreciated through a discussion of various examples using this context.

In some embodiments, a processor may receive user data associated with one or more locations of a user within an environment. In some embodiments, the processor may receive edge computing data associated with utilization of edge computing resources by the user. In some embodiments, the environment may be an enclosed location having spatial boundaries. In some embodiments, the environment may be a location such as a home, workplace, hospital, library, school, café, etc. In some embodiments, the user data may include data related to the dimensions of the environment (e.g., house). In some embodiments, the one or more locations of the user may be monitored using sensors (e.g., sensors for tracking) on mobile computing devices (e.g., mobile phones, tablets, laptops, smartwatches, etc.) that are moved by the user. In some embodiments, the one or more locations of the user may be monitored using IoT connected devices positioned at a distance from the user that have sensors that monitor the movement of the user (e.g., GPS location on a phone, motion sensors, etc.). It is noted that in any embodiment including the monitoring of user movement, the user will have to opted-in to having their movement monitored.

In some embodiments, the processor may receive data associated with utilization of edge computing resources (e.g., for charging a mobile device, storing data, etc.) by the user. In some embodiments, edge computing data may relate to the amount and types of edge computing needs of the user. In some embodiments, the edge computing data may relate to the edge computing resources utilized by or required by (e.g., edge computing resources were sought but not utilized because of their lack of availability) the user as she moves from one location to another in the environment (or on the periphery of or proximate to the environment). In some embodiments, the edge computing data may relate to the edge computing resources utilized by or required by the user over time (e.g., time of the need, duration of the need) or edge computing resources associated with a contextual scenario (e.g., weather, the occurrence of a special event, etc.). In some embodiments, the edge computing data may include data regarding routinely scheduled activities of the edge computing devices (e.g., activities not related to edge computing), the working condition of the edge computing devices, and the activity levels of the edge computing devices.

For example, a user may move throughout her home every day. The user may watch a movie in living room in the evening, check and respond to email on weekday mornings from the kitchen, work on weekday afternoons in living room and downstairs office, play video games in the afternoon weekend in the basement, etc. The user data may relate to the locations where the user is historically located in or proximate to the environment at a given time. The edge computing data may be associated with the user's use of or need for edge computing resources (e.g., amounts of memory, amounts of computing resources, data storage, data to power devices, etc.).

In some embodiments, the processor may analyze the edge computing data to associate a context with an edge computing resource need. In some embodiments, the context may relate to the time and duration of the edge computing resource need, including time of day, day of week, day of month, date, month of year, season, etc. In some embodiments, the context may relate to a situational context including, for example, a holiday or calendar event, the occurrence of a special event (e.g., the occurrence of the World Cup tournament), a computer system malfunction in another computing system, receipt of a communication (e.g., email, telephone, voicemail, text, etc.), receipt of a communication regarding predetermined special events, weather event, etc. In some embodiments, the context may relate to the location of the user in the environment, the position of the user within a certain area of the environment, the location of the user in proximity to another location or object (e.g., desk, dining room table), the anticipated location of the user, the direction and/or duration of movement of the user, the duration for which the user stays in the any of these locations, etc.

In some embodiments, the processor may determine a first location of the user in the environment at a first time. In some embodiments, the processor may predict, using the artificial intelligence model, a first edge computing need of the user in the first location. For example, the processor may predict based on the date and time (e.g., Saturday morning of the last week of the month) that a person may have high edge computing needs in the dining room of her home as she reviews relevant portions of video clips from sales meetings that happened during the previous month at work while having breakfast. The processor may predict the first edge computing need of the user (e.g., in terms of processors, power, storage, connectivity, computational memory, data processing, etc.).

In some embodiments, the processor may determine the location of the user from sensors located on a computing device in the user's possession. In some embodiments, the artificial intelligence model may predict the location of the user based on the context associated with the user being in the first location and an identification of the context. In some embodiments, the artificial intelligence model may make predictions about the edge computing needs of the user based on the context associated with the first edge computing need and an identification of the context. In some embodiments, the artificial intelligence model may be a classification deep learning model. In some embodiments, the artificial intelligence model may be trained using historical data regarding activities that the user will be performing (e.g., computing activities) and devices that can be repositioned to support edge computing.

In some embodiments, the processor may determine an arrangement of edge computing devices configured to meet the first edge computing need of the user at the first time. Continuing the previous example, there may be respective edge computing devices in two rooms that are next to the dining room, and these two devices, located in close proximity to the dining room, may provide enough computing resources for edge computing by the user located in the dining room.

In some embodiments, the arrangement of edge computing devices configured to meet the first edge computing need may include the location of one or more edge computing devices within or proximate to the environment, the orientation of the devices, the number of devices, the operational capacity of the devices (e.g., switch from low power mode to optimal power mode), etc. In some embodiments, the arrangement of edge computing devices configured to meet the first edge computing need may take into account the predicted capacity/capability of the edge computing devices, including how much data they can store, processing power, power of the edge computing device, the area of coverage of its connectivity, etc.

In some embodiments, the arrangement of the one or more edge computing devices may be based on a prediction of the time, duration, and type of need (e.g., storage, processing, etc.) for each edge computing device in the environment (e.g., home) or proximate to the first location (e.g., proximate to dining room). In some embodiments, the arrangement of the one or more edge computing devices may include assignment of activities to edge computing devices and/or mobile edge computing devices based on the capabilities of the devices (e.g., processing power or network connectivity) so that resources can be utilized in an optimized manner.

In some embodiments, the arrangement of edge computing devices may be determined by comparing the edge computing need of the device in the location to a threshold. If the edge computing need is above a threshold (e.g., 500 mbps), then an edge computing device may be moved to a location near the location of the edge computing need. In some embodiments, the arrangement may be determined by signal strength or the proximity of the edge computing devices to the device having an edge computing need.

In some embodiments, the processor may send a command to make a first mobile edge computing device move to a second location at a first time. Continuing the previous example, the arrangement of two edge computing devices in rooms that are next to the dining room may not provide enough computing resources for edge computing by the user located in the dining room. In some embodiments, an mobile edge computing device (e.g., an edge computing device having the ability to move [by a motor, autonomously, etc.] or be moved by a non-human from one location in or proximate to the environment to another location) may be utilized to meet the edge computing need of the first user at the first time. In some embodiments, the mobile edge computing device may be moved or may move from one location to another by robotic means (e.g., moved by a robot or located on a robotic device such as a robotic toy or a robotic vacuum cleaning device). For example, a robotic vacuum having edge computing capability may move to the entryway of the dining room (e.g., second location) to be near the predicted location of the user at or by the first time (e.g., the time associated with the edge computing need of the user). In this example, the first mobile edge computing device may be included in the arrangement of one or more edge computing devices configured to meet the first edge computing need of the user.

In some embodiments, the processor may identify scheduled activities of a second mobile edge computing device at the first time. In some embodiments, the processor may send a command to make the second mobile edge computing device move to a third location at a first time.

In some embodiments, the scheduled activities of the second mobile device may be activities not related to edge computing that the second device is predicted to engage in. In some embodiments, the second device may communicate with the processor regarding the non-edge computing activities that the second device is schedule to perform at the first time. In some embodiments, the scheduled activities may be used by the processor to select which mobile edge computing device is to be moved to a new location (e.g., the third location). For example, the second mobile edge computing device may be an electronic toy helicopter that moves to the hallway adjacent to the entryway of the dining room (e.g., where the first mobile edge computing device was moved to). In some embodiments, the toy helicopter may have been selected to move to the third location because it was not scheduled to perform any scheduled activities at the first time or because the activities it was scheduled to perform could be rescheduled to another time.

In some embodiments, the second mobile edge computing device may be part of the arrangement of edge computing devices configured to meet the first edge computing need of the user (e.g., the second mobile edge computing device is an IoT device that has available computing resources that can be utilized to help with the needs of the edge computing device used by the user). In some embodiments, the third location may be a different location than the second location.

In some embodiments, the processor may send a command to make a first edge computing device schedule activities that are predicted to affect the edge computing capability of the first edge computing device for another time. For example, the first mobile edge computing device (e.g., the robotic vacuum cleaner) may be scheduled to vacuum a room other than the dining room during a time period that overlaps with the first time (e.g., time of the predicted edge computing need). The processor may signal to the edge computing device at or before the first time to reschedule the vacuuming activity for another time that does not conflict with the time or duration of the arrangement of the edge computing devices that meets the predicted need of the user at the first time.

In some embodiments, the first edge computing device may be a non-mobile edge computing device (e.g., a smart washer/dryer, smart refrigerator, a smartphone that can only be moved by a user, etc.). In some embodiments, the first edge computing device may be a mobile edge computing device. In some embodiments, activities that are predicted to affect the edge computing capability of the edge computing device may include activities that require the edge computing device to be located in a different location than the third location or activities that reduce the edge computing capacity of the devices (reduce processing power, storage power, battery recharging power, etc.).

In some embodiments, the processor may identify a fourth location of the user in the environment at a second time. In some embodiments, the processor may predict a second edge computing need of the user in the fourth location. In some embodiments, the processor may determine a second arrangement of edge computing devices configured to meet the edge computing need of the user at the second time. In some embodiments, the processor may be able to determine a second arrangement of edge computing devices configured to meet the edge computing need of the user at a second time based on a movement of the user to the fourth location (e.g., to the kitchen to have lunch in the afternoon). In some embodiments, the fourth location may be a location to which the user is predicted to go. In some embodiments, the fourth location may be identified by tracking the movement of the user. In some embodiments, as the user moves from the first location to the fourth location, edge computing activities may be reassigned to the nearest devices that supports edge computing based on the mobility and relative position of the user.

In some embodiments, the processor may send a command to make the first mobile edge computing device to move to a fifth position at the second time. For example, to meet to the predicted edge computing need of the user at a second time, the robotic vacuum may move to another location.

In some embodiments, the system for positioning of edge computing devices may also be configured to predict an arrangement of edge computing devices configured to meet the edge computing needs of another user at another time. In some embodiments, the system for positioning of edge computing devices may predict an arrangement of edge computing deices configured to meet the edge computing needs of two or more users at the same time.

In some embodiments, the processor may receive second user data associated with movement of a second user in the environment. In some embodiments, the processor may receive second edge computing data associated with utilization of edge computing resources by the second user. In some embodiments, the processor may analyze the second edge computing data to associate a context with an edge computing resource need. In some embodiments, the processor may analyze the second user data to associate a context with a location of the second user within the environment. In some embodiments, the processor may predict determine a sixth location of the second user in the environment at a third time. In some embodiments, the processor may predict, using the artificial intelligence model, a second edge computing need of the second user in the sixth location. In some embodiments, the processor may determine an arrangement of edge computing devices configured to meet the edge computing need of the second user at the third time.

For example, data about the movement of a second user in the home and the edge computing of the second user may be obtained. The processor may be configured to analyze this data in addition to the data of the first user to predict the location of the second user in the home and the edge computing need of the second user at various times. The processor may determine an arrangement of edge computing devices that is configured to meet the edge computing need of the second user.

In some embodiments, the processor may send a command to make a first mobile edge computing device (e.g., robotic vacuum cleaner) move to a seventh position at the third time to meet the edge computing needs of the second user. In some embodiments, the processor may determine an arrangement of one or more edge computing devices (including mobile edge computing devices) configured to meet the edge computing needs of a first user and a second user during overlapping times.

In some embodiments, the processor may receive, from a first (IoT) device, location data associated with a user. For example, the user may be using an IoT device in a particular room of her house, and the data regarding the user's location may be received by a processor of the user's home internet network. In some embodiments, the processor may determine an edge computing requirement for the first device. For example, the first device may require internet bandwidth that exceeds a threshold bandwidth amount. The processor may analyze the bandwidth requirement of the first device to identify that it exceeds the bandwidth threshold amount.

In some embodiments, the processor may predict, by an AI model, a position to place a second device. For example, the second device may be an IoT device having edge computing capabilities. In some embodiments, the processor may arrange the second device in the position. The second IoT device may be commanded to move to a location where the second IoT device may provide the internet connectivity required by the first device. The arrangement may increase data transfer and keep internet bandwidth for the first device.

Referring now to FIG. 1, a block diagram of a system 100 for positioning of edge computing devices is illustrated. System 100 includes user devices 102A-B, edge computing devices 104A-C, mobile edge computing device 106A-B, and a system device 108. The system device 108 is configured to be in communication with user devices 102A-B, edge computing devices 104A-C, and mobile edge computing device 106A-B. The system device 104 includes an artificial intelligence model 110, a mobile device signaler 112, and a database 114. The database 114 stores the user data and edge computing data. In some embodiments, the user devices 102A-B, edge computing devices 104A-C, mobile edge computing device 106A-B, and system device 1081 may be any devices that contain a processor configured to perform one or more of the functions or steps described in this disclosure. In some embodiments, the user devices 102A-B, edge computing devices 104A-C, and mobile edge computing device 106A-B are computing devices connected in an internet-of-things network.

In some embodiments, user data associated with one or more locations of a user in an environment may be collected from user devises 102A-B, edge computing devices 104A-C, or mobile edge computing devices 106A-B. For example, the movement of the user may be tracked by sensors (not shown) on user devices 102A or 102B as the user moves from one location to another while utilizing user devices 102A-B (e.g., a smartwatch, mobile phone, etc.). The edge computing data associated with the utilization of edge computing resources by the user may be collected from edge computing devices 104A-C or mobile edge computing devices 106A-B that are engaged in edge computing with the user devices 102A-B during the time period during which edge computing data is being collected. System device 108 receives the user data and the edge computing data and stores the data in database 114. The artificial intelligence model 110 of the system device 108 analyzes the edge computing data to associate a context with an edge computing resource need and analyzes the user data to associate the context with a location of the user within the environment. The artificial intelligence model 110 predicts a first location of the user in the environment at a first time and a first edge computing need of the user in the first location. System device 108 determines an arrangement of one or more edge computing devices (e.g., edge computing devices 104A-C and mobile edge computing devices 106A-B) configured to meet the first edge computing need of the user at the first time.

In some embodiments, the mobile device signaler 112 may be utilized to signal to a first mobile edge computing device (mobile edge computing device 106A) to move to a second location at the first time in order to meet the first edge computing need of the user at the first time. In some embodiments, the mobile device signaler 112 may be utilized to signal to a second mobile edge computing device (mobile edge computing device 106B) to move to a third location at the first time in order to meet the first edge computing need of the user at the first time. The artificial intelligence model 110 may identify scheduled activities of the second mobile edge computing device 106B to check whether mobile edge computing device 106B should be selected to be moved to the third location at the first time. In some embodiments, the mobile device signaler 112 may be utilized to signal to edge computing device 104A to schedule activities that are predicted to affect its edge computing capability to another time.

In some embodiments, the user who is utilizing user device 102A may move to another location in the environment, a fourth location. The system device 108 may identify a fourth location of the user (e.g., by tracking user device 102A) and predict a second edge computing need of the user in the fourth location. The artificial intelligence model 110 may be utilized to determine a second arrangement of edge computing devices (e.g., edge computing devices 104A-C and mobile edge computing devices 106A-B) configured to meet the edge computing need of the user at the second time. In some embodiments, the mobile device signaler may be utilized to signal to the mobile edge computing device 106B to move to a fifth location at or by the second time.

In some embodiments, system device 108 may be configured to predict the edge computing need of second user at a location (e.g., sixth location) other than the location of a first user and determine an arrangement of edge computing devices (e.g., edge computing devices 104A-C and mobile edge computing devices 106A-B) configured to meet the edge computing need of the second user at the time of the need. In some embodiments, the system device 108 may be configured to determine an arrangement of edge computing devices (e.g., edge computing devices 104A-C and mobile edge computing devices 106A-B) configured to meet the edge computing needs of the first user and the second user during simultaneous or overlapping time periods.

Figure 2:
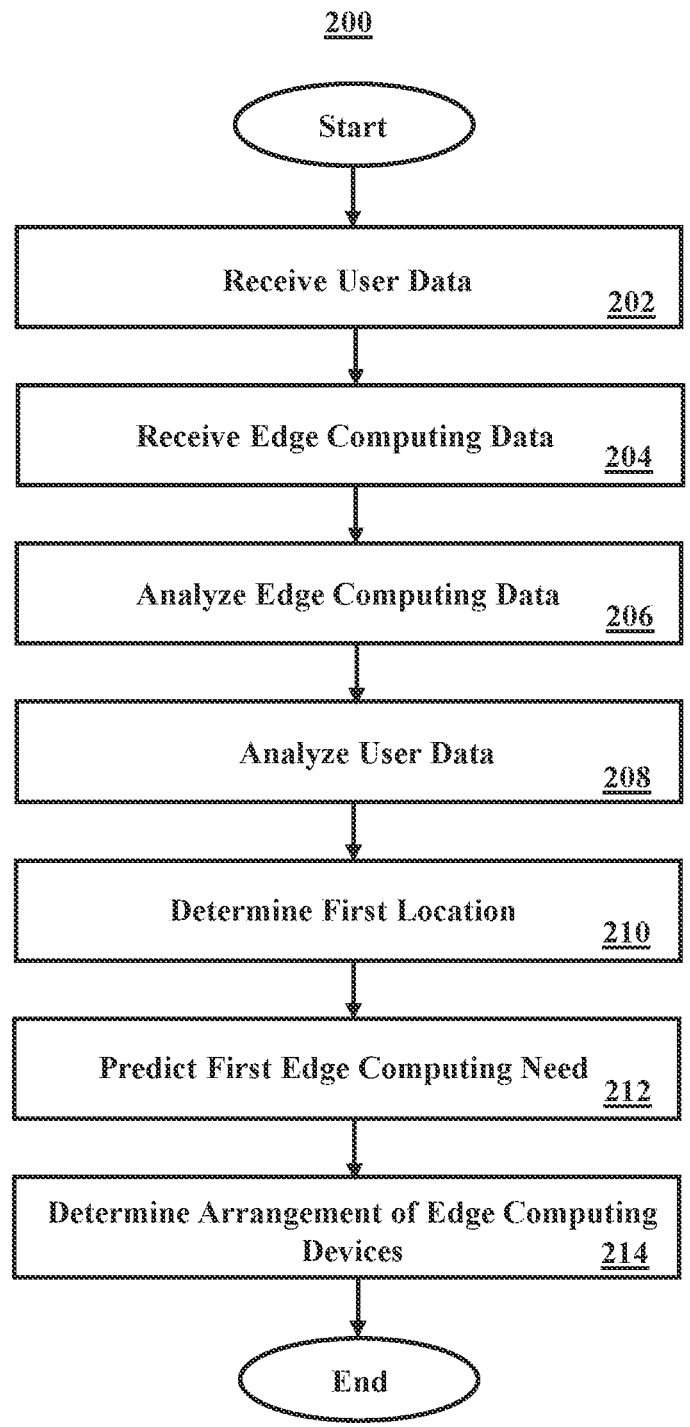
FIG. 2 is a flowchart of an exemplary method for positioning edge computing devices, in accordance with aspects of the present disclosure.

Referring now to FIG. 2, illustrated is a flowchart of an exemplary method 200 for positioning of edge computing devices, in accordance with embodiments of the present disclosure. In some embodiments, a processor of a system may perform the operations of the method 200. In some embodiments, method 200 begins at operation 202. At operation 202, the processor receives user data associated with movement of a user within an environment. In some embodiments, method 200 proceeds to operation 204, where the processor receives edge computing data associated with utilization of edge computing resources by the user. In some embodiments, method 200 proceeds to operation 206. At operation 206, the processor analyzes the edge computing data to associate a context with an edge computing resource need. In some embodiments, method 200 proceeds to operation 208. At operation 208, the processor analyzes the user data to associate a context with a location of the user within the environment. In some embodiments, method 200 proceeds to operation 210. At operation 210, the processor determines a first location of the user in the environment at a first time. In some embodiments, method 200 proceeds to operation 212. At operation 212, the processor predicts, using the artificial intelligence model, a first edge computing need of the user in the first location. In some embodiments, method 200 proceeds to operation 214. At operation 214, the processor determines an arrangement of one or more edge computing devices configured to meet the first edge computing need of the user at the first time.

As discussed in more detail herein, it is contemplated that some or all of the operations of the method 200 may be performed in alternative orders or may not be performed at all; furthermore, multiple operations may occur at the same time or as an internal part of a larger process.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
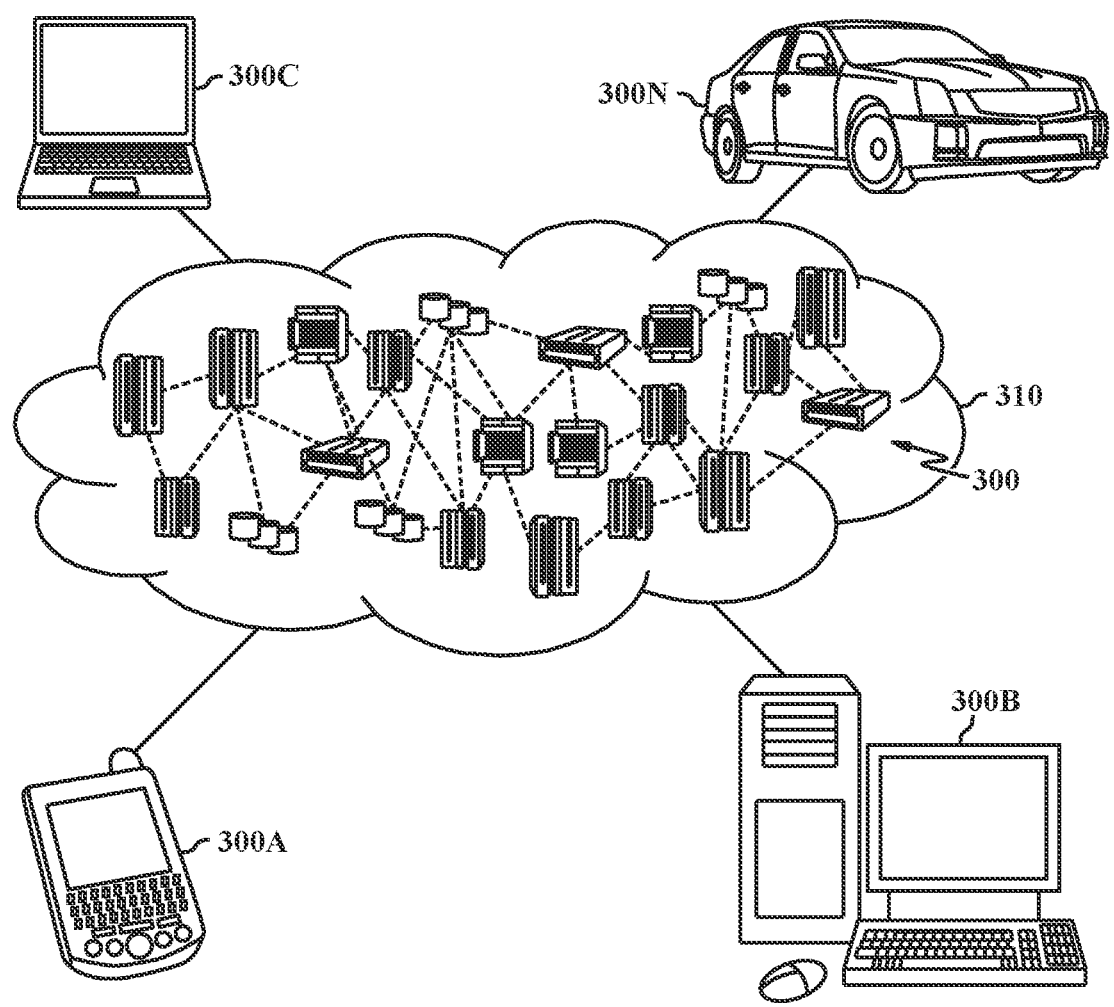
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
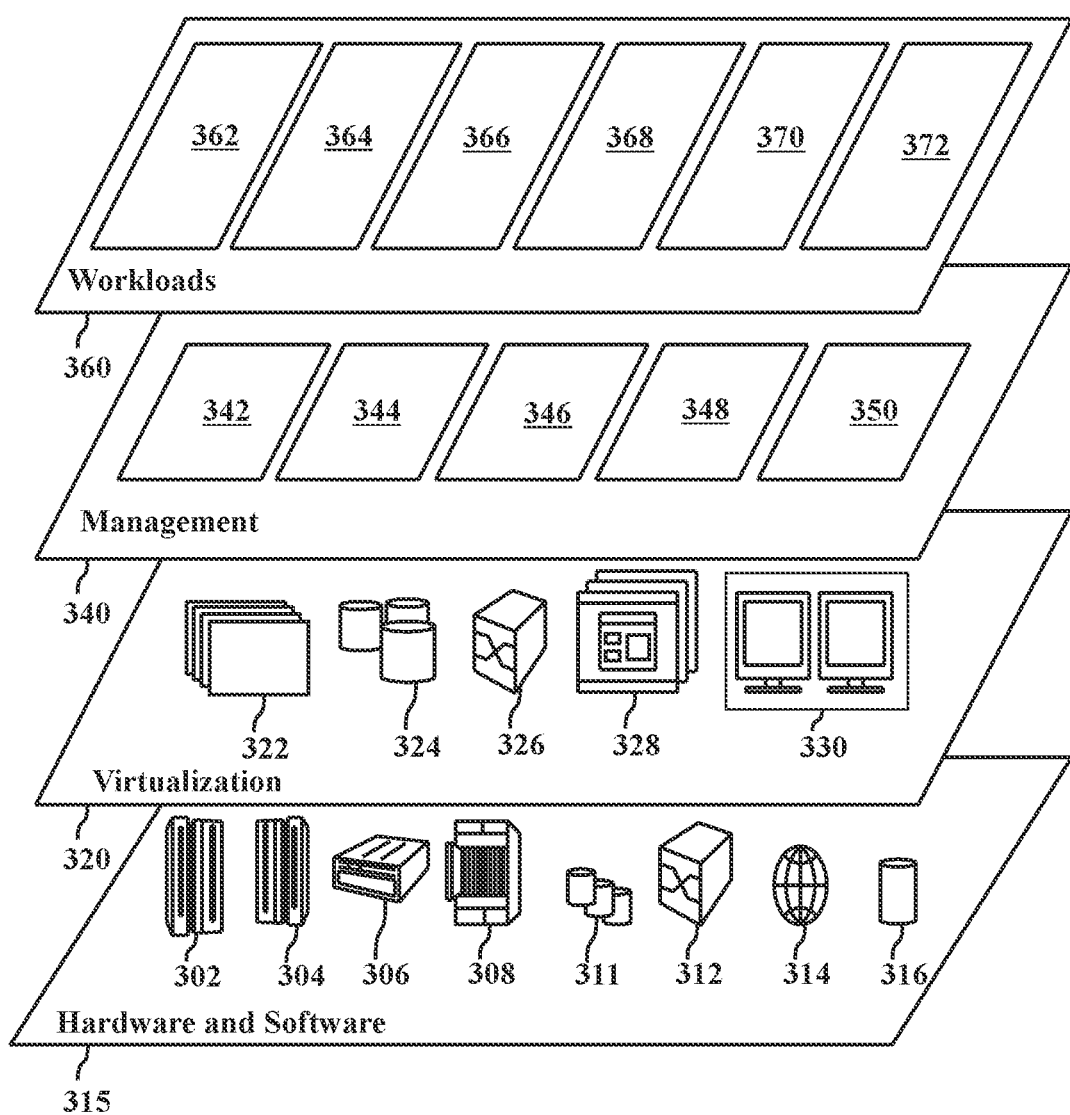
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and positioning edge computing devices to meet the edge computing needs of a user 372.

Figure 4:
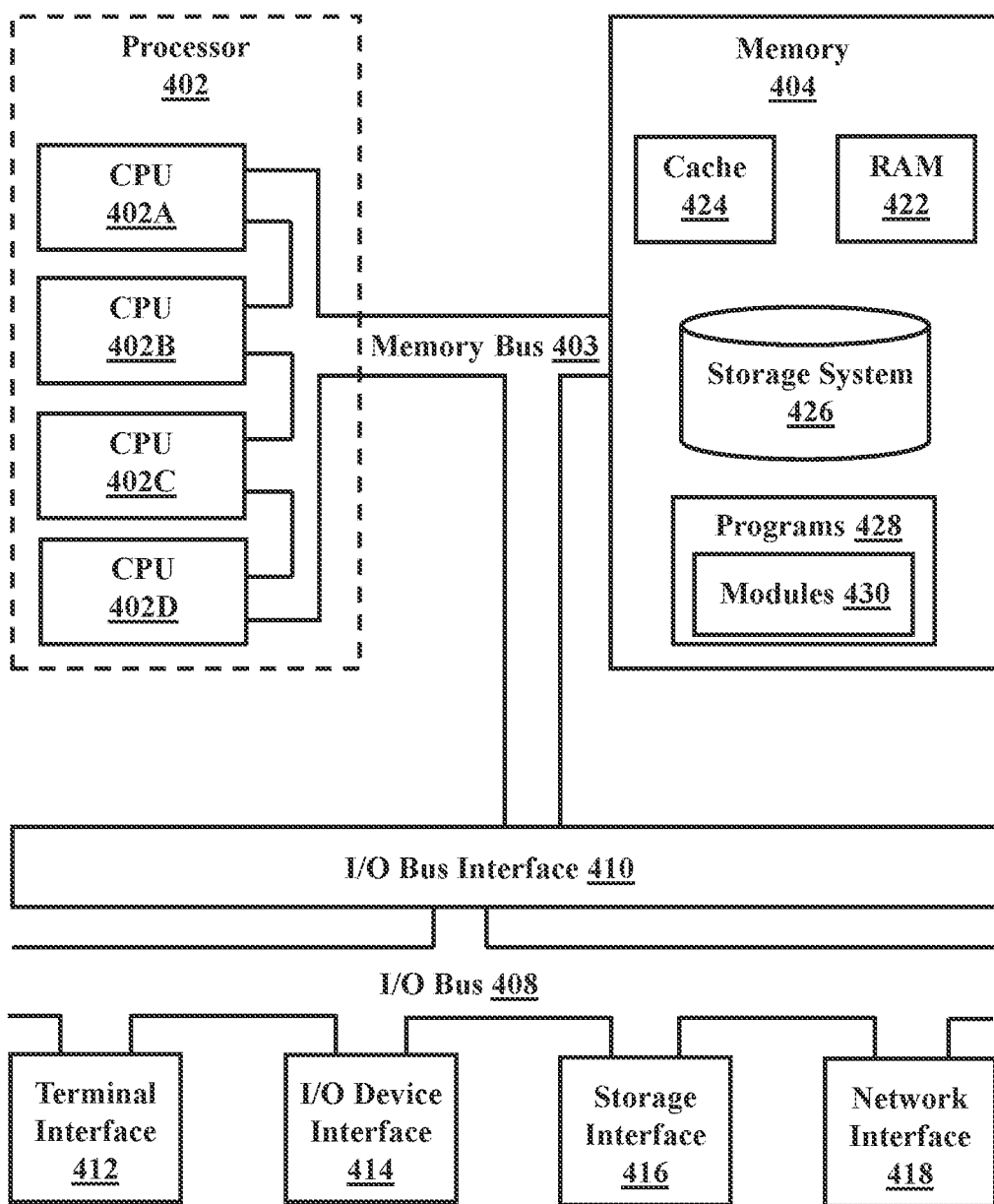
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media)

having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method, the method comprising:
   receiving, by a processor, user data associated with one or more locations of a user in an environment;
   receiving edge computing data associated with utilization of edge computing resources by the user;
   analyzing the edge computing data to associate a context with an edge computing resource need;
   analyzing the user data to associate the context with a location of the user within the environment;
   determining a first location of the user in the environment at a first time;
   predicting, using the artificial intelligence model, a first edge computing need of the user in the first location; and
   determining an arrangement of one or more edge computing devices configured to meet the first edge computing need of the user at the first time.

2. The method of claim 1, further comprising:
   sending, by the processor, a command to make a first mobile edge computing device move to a second location at the first time.

3. The method of claim 2, further comprising:
   identifying scheduled activities of a second mobile edge computing device at the first time; and
   sending, by the processor, a command to make the second mobile edge computing device move to a third location at the first time.

4. The method of claim 1, further comprising sending, by the processor, a command to make a first edge computing device schedule activities that are predicted to affect the edge computing capability of the first edge computing device to another time.

5. The method of claim 2, further comprising:
   identifying a fourth location of the user in the environment at a second time;
   predicting a second edge computing need of the user in the fourth location; and
   determining a second arrangement of edge computing devices configured to meet the edge computing need of the user at the second time.

6. The method of claim 5, further comprising sending, by the processor, a command to make the first mobile edge computing device move to a fifth location at the second time.

7. The method of claim 1, further comprising:
   receiving, by the processor, second user data associated with one or more locations of a second user within the environment;
   receiving second edge computing data associated with utilization of edge computing resources by the second user;
   analyzing the second edge computing data to associate a context with an edge computing resource need;
   analyzing the second user data to associate the context with a location of the second user within the environment;
   determining a sixth location of the second user in the environment at a third time;
   predicting, using the artificial intelligence model, a second edge computing need of the second user in the sixth location; and
   determining an arrangement of edge computing devices configured to meet the edge computing need of the second user at the third time.

8. The method of claim 7, further comprising sending, by the processor, a command to make a first mobile edge computing device move to a seventh location at the third time.

9. A system comprising:
   a memory; and
   a processor in communication with the memory, the processor being configured to perform operations comprising:
      receiving user data associated with one or more locations of a user in an environment;
      receiving edge computing data associated with utilization of edge computing resources by the user;
      analyzing the edge computing data to associate a context with an edge computing resource need;
      analyzing the user data to associate the context with a location of the user within the environment;
      determining a first location of the user in the environment at a first time;
      predicting, using the artificial intelligence model, a first edge computing need of the user in the first location; and
      determining an arrangement of one or more edge computing devices configured to meet the first edge computing need of the user at the first time.

10. The system of claim 9, the processor being further configured to perform operations comprising:
    sending, by the processor, a command to make a first mobile edge computing device move to a second location at the first time.

11. The system of claim 10, the processor being further configured to perform operations comprising:
    identifying scheduled activities of a second mobile edge computing device at the first time; and sending, by the processor, a command to make the second mobile edge computing device move to a third location at the first time.

12. The system of claim 9, the processor being further configured to perform operations comprising: sending, by the processor, a command to a first edge computing device to schedule activities that are predicted to affect the edge computing capability of the first edge computing device to another time.

13. The system of claim 10, the processor being further configured to perform operations comprising:
    identifying a fourth location of the user in the environment at a second time;
    predicting a second edge computing need of the user in the fourth location; and
    determining a second arrangement of edge computing devices configured to meet the edge computing need of the user at the second time.

14. The system of claim 13, the processor being further configured to perform operations comprising: sending, by the processor, a command to make the first mobile edge computing device move to a fifth location at the second time.

15. The system of claim 9, the processor being further configured to perform operations comprising:
   receiving, by the processor, second user data associated with one or more locations of a second user in the environment;
   receiving second edge computing data associated with utilization of edge computing resources by the second user;
   analyzing the second edge computing data to associate a context with an edge computing resource need;
   analyzing the second user data to associate the context with a location of the second user within the environment;
   determining a sixth location of the second user in the environment at a third time;
   predicting, using the artificial intelligence model, a second edge computing need of the second user in the sixth location; and
   determining an arrangement of edge computing devices configured to meet the edge computing need of the second user at the third time.

16. The system of claim 15, the processor being further configured to perform operations comprising: sending, by the processor, a command to make a first mobile edge computing device move to a seventh location at the third time.

17. A computer program product comprising a computer readable storage medium having program instructions embodied therewith, the program instructions executable by a processor to cause the processor to perform operations, the operations comprising:
   receiving user data associated with one or more locations of a user in an environment;
   receiving edge computing data associated with utilization of edge computing resources by the user;
   analyzing the edge computing data to associate a context with an edge computing resource need;
   analyzing the user data to associate the context with a location of the user within the environment;
   determining a first location of the user in the environment at a first time;
   predicting, using the artificial intelligence model, a first edge computing need of the user in the first location; and
   determining an arrangement of one or more edge computing devices configured to meet the first edge computing need of the user at the first time.

18. The computer program product of claim 17, the processor being further configured to perform operations comprising: sending, by the processor, a command to make a first mobile edge computing device move to a second location at the first time.

19. The computer program product of claim 18, the processor being further configured to perform operations comprising:
   identifying scheduled activities of a second mobile edge computing device at the first time; and
   sending a command to make the second mobile edge computing device move to a third location at the first time.

20. The computer program product of claim 17, the processor being further configured to perform operations comprising: sending, by the processor, a command to a first edge computing device to schedule activities that are predicted to affect the edge computing capability of the first edge computing device to another time.

* * * * *